(12) United States Patent
Svartz et al.

(10) Patent No.: US 7,051,851 B2
(45) Date of Patent: May 30, 2006

(54) LOCKING SUSPENSION SYSTEM

(75) Inventors: Bjorn O. Svartz, Jamestown, NC (US); Darris White, Superior, CO (US)

(73) Assignee: Volvo Trucks North America Inc., Greensboro, NC (US)

(*) Notice: Subject to any disclaimer, the term of this patent is extended or adjusted under 35 U.S.C. 154(b) by 231 days.

(21) Appl. No.: 10/287,291

(22) Filed: Nov. 4, 2002

(65) Prior Publication Data
US 2004/0084266 A1 May 6, 2004

(51) Int. Cl.
*F16F 9/32* (2006.01)

(52) U.S. Cl. ............... 188/300; 280/5.504; 280/5.507; 280/6.157

(58) Field of Classification Search ............... 188/300, 188/266.1, 266.5; 180/89.13–89.15; 280/5.5, 280/5.504, 5.507, 5.512, 5.514, 5.515, 6.15, 280/6.157, 6.159, 6.16; 700/44; 702/181, 702/179; 701/48, 36, 70
See application file for complete search history.

(56) References Cited

U.S. PATENT DOCUMENTS

| | | | | |
|---|---|---|---|---|
| 4,483,409 A | * | 11/1984 | Fun | 180/89.15 |
| 5,044,455 A | * | 9/1991 | Tecco et al. | 180/89.13 |
| 5,200,896 A | * | 4/1993 | Sato et al. | 701/70 |
| 5,513,875 A | | 5/1996 | Tahara et al. | |
| 5,692,587 A | | 12/1997 | Fratini, Jr. | |
| 5,785,345 A | * | 7/1998 | Barlas et al. | 280/124.165 |
| 6,015,155 A | * | 1/2000 | Brookes et al. | 280/5.505 |
| 6,070,681 A | * | 6/2000 | Catanzarite et al. | 180/89.15 |
| 6,810,314 B1 | * | 10/2004 | Tashiro et al. | 701/48 |
| 6,883,810 B1 | * | 4/2005 | Svartz et al. | 280/5.519 |

* cited by examiner

*Primary Examiner*—Pam Rodriguez
(74) *Attorney, Agent, or Firm*—Martin Farrell

(57) ABSTRACT

A method and apparatus for controlling frame rise on a heavy duty truck having a frame, a drive axle connected to the frame, and a selectively lockable suspension component disposed therebetween for maintaining the relative position therebetween. Signals indicative of at least one of the following vehicle operating parameters: engine speed, brake pressure, vehicle speed, air bag pressure, steering wheel angle, vehicle height, or throttle position are monitored and a predicted thrust is calculated that will be applied to the drive axle based on the monitored signals. The selectively lockable suspension component is locked if the predicted thrust exceeds a predetermined threshold and is also controlled with respect to other operating parameters such as whether vehicle brakes are applied, any instantaneous change in torque, vehicle operating speed, and the length of time the selectively lockable suspension component has been locked.

22 Claims, 3 Drawing Sheets

LOCKING SUSPENSION SYSTEM

TECHNICAL FIELD

The invention relates generally to suspension systems for over the highway, heavy duty trucks and more particularly to a locking suspension system that locks the vehicle suspension during vehicle accelerations that may cause driveline misalignment.

BACKGROUND OF THE INVENTION

The frames of heavy duty trucks are typically suspended on torque reactive rear suspensions. When torque is applied to the truck drivetrain, the frame of the truck tends to raise and move away from the drive axle. This frame motion causes many problems, including wheel hop and driveline misalignment. With recent advances in engine technology, higher horsepower and increased torque capabilities have exacerbated this frame motion and its attendant problems. In particular, increased driveline misalignment can cause vibration that is transmitted to the cab of the vehicle to the detriment of the ride quality experienced by the driver.

Several techniques have been used in the art to adaptively control the position of the frame in vehicles. For example U.S. Pat. Nos. 5,529,153 and 4,743,046 to Smith and Schnittger, respectively present vehicle suspension systems featuring damping components whose damping characteristics vary as a function of vehicle position, i.e. provide a stiffer suspension when vehicle tilt is above a predetermined threshold. U.S. Pat. No. 5,785,345 to Barlas et al. describes a heavy duty truck suspension that includes a hydraulic lock structure that is selectively locked when frame height raises above a nominal ride height. One of the hydraulic lock structures disclosed features a pair of hydraulic cylinders disposed between the vehicle frame and suspension. The hydraulic cylinders are in fluid communication with a fluid reservoir to provide cushioning when the vehicle is operating at nominal ride height, and a control valve blocks the flow to the reservoir when the vehicle is experiencing frame rise, thereby locking the frame with respect to the suspension once the frame has risen above a threshold amount.

While it is believed that these systems provide an improved amount of control over frame position during vehicle operation, these systems rely on the position of the frame to trigger the control effort. As such, the vehicle must experience a certain amount of frame motion beyond a desired position prior to correction.

SUMMARY OF THE INVENTION

A frame locking system that is responsive to an amount of torque that is being provided by the engine can prevent frame rise before it starts.

According to an embodiment, frame rise is controlled on a heavy duty truck having a frame, a drive axle connected to the frame, and a selectively lockable suspension component disposed therebetween for maintaining the relative position therebetween by employing method steps that selectively lock the suspension component. Signals indicative of vehicle operating parameters are monitored and a predicted torque that will be applied to the drive axle is calculated based on the monitored signals. The selectively lockable suspension component is locked if the predicted torque exceeds a predetermined threshold. Preferably, signals indicative of at least one of the following vehicle operating parameters: engine speed, engine torque, brake pressure, vehicle speed, air bag pressure, steering wheel angle, vehicle height, or throttle position are monitored and used to calculate the predicted torque. Alternatively, a predicted thrust can be derived from the predicted torque and compared to a thrust threshold.

According to a preferred embodiment, the selectively lockable suspension component is unlocked if certain criteria are met. According to a feature of this embodiment the selectively lockable suspension component is unlocked when the brakes are engaged. According to another feature of this embodiment, the selectively lockable suspension component is unlocked if the instantaneous change in predicted torque exceeds a predetermined threshold. According to an additional feature, the selectively lockable suspension component is unlocked if the vehicle speed is higher than a predetermined nominal operating speed, such as 40 miles per hour, and the selectively lockable suspension component has been locked for more than a first time limit, such as two seconds. According to yet another feature, the selectively lockable suspension component is unlocked if the vehicle speed is lower than the predetermined nominal operating speed, such as 40 miles per hour, the predicted torque is lower than a lower torque threshold such as 500 foot-pounds, and the selectively lockable suspension component has been locked for more than a second time limit, such as two seconds. According to a final feature, the selectively lockable suspension component is unlocked if the vehicle speed is lower than the predetermined nominal operating speed, such as 40 miles per hour, the predicted torque is higher than a lower thrust threshold such as 500 foot-pounds, and the selectively lockable suspension component has been locked for more than a third time limit, such as two minutes.

These and other objects, advantages, and features of the invention will be better understood from the accompanying detailed description of preferred embodiments of the invention when reviewed in conjunction with the accompanying drawings.

BRIEF DESCRIPTION OF THE DRAWINGS

The present invention is illustrated by way of example and not limitation in the figures of the accompanying drawings, in which.

DETAILED DESCRIPTION OF THE PREFERRED EMBODIMENT

Figure 1:
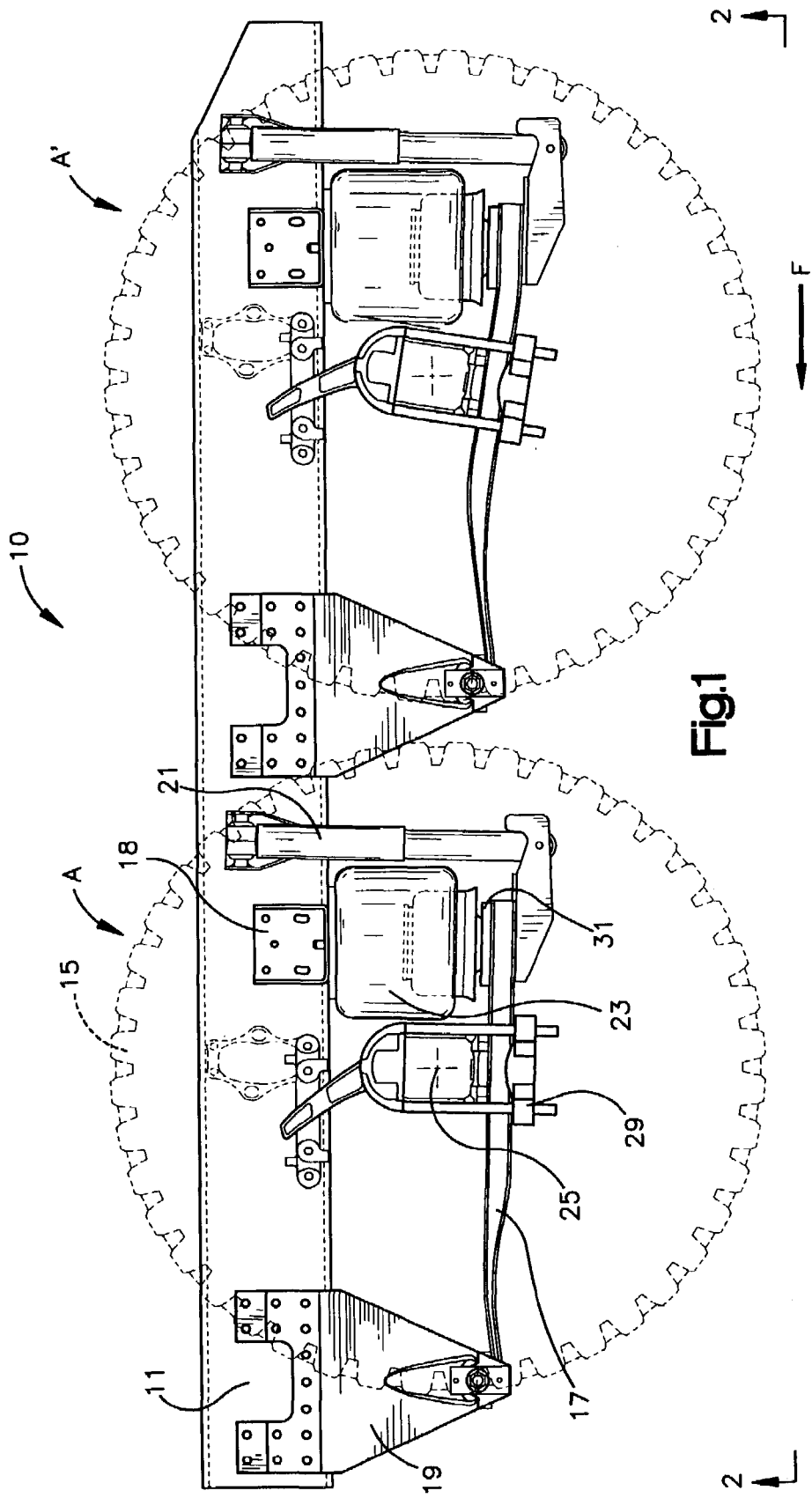
FIG. 1 is a front plan view of a heavy duty truck suspension system constructed in accordance with an embodiment of the present invention.

FIG. 1 depicts a front plan view of a trailing arm torque reactive suspension system 10 associated with a pair of rear wheel sets A and A' that drive a frame member 11 of a heavy duty truck. The basic components that make up the suspension system associated with each wheel set are identical. However, wheel sets A and A' are designed to be at different angles in the static position because the first drive axle shown as part of A has a torque divider to split power between the two drive axles and subsequently the interaxle driveshaft (not shown) is attached to the first (A) drive axle at a higher location than the second (A') drive axle. In order to minimize the vibration levels, the two axles must minimize the difference in the working angles of the interaxle U-joints, and hence the difference in angles. The basic components of the suspension system 10 should be familiar to one of skill in the art and will only be outlined generally below.

The suspension system 10 includes a main support member 17 that is pivotally connected to the frame 11 by a mounting bracket 19. A drive axle 25 is attached to the main support member using a U bolt 29. An air spring 23 is bolted at its base to a base bracket 31 which is in turn connected to the main support member 17. The top of the air spring 23 is attached to the adjacent side of the frame member 11 by means of a bracket 18. A locking shock absorber 21 is connected between the main support member 17 and the frame member 11 to damp the rise and fall of the frame of the vehicle with respect to the road and in addition to lock the relative position of the frame member 11 and the drive axle 25 when relatively large torque is produced at the drive axle when the truck is accelerating forward. This locking feature is controlled by a controller 40 (FIG. 2) according to an algorithm to be described herein. As can be seen from the wheel set A', the frictional force F on tire assemblies 15 caused by torque on the drive axle 25 tends to "open" the suspension system and extend the shock absorber 21. As discussed in the background section, this separation or frame rise can be detrimental to drive train components and the level of operator comfort. It will be appreciated that other locking suspension components such as an adjustable length strap or an auxiliary hydraulic locking mechanism can be used to practice the present invention.

Figure 2:
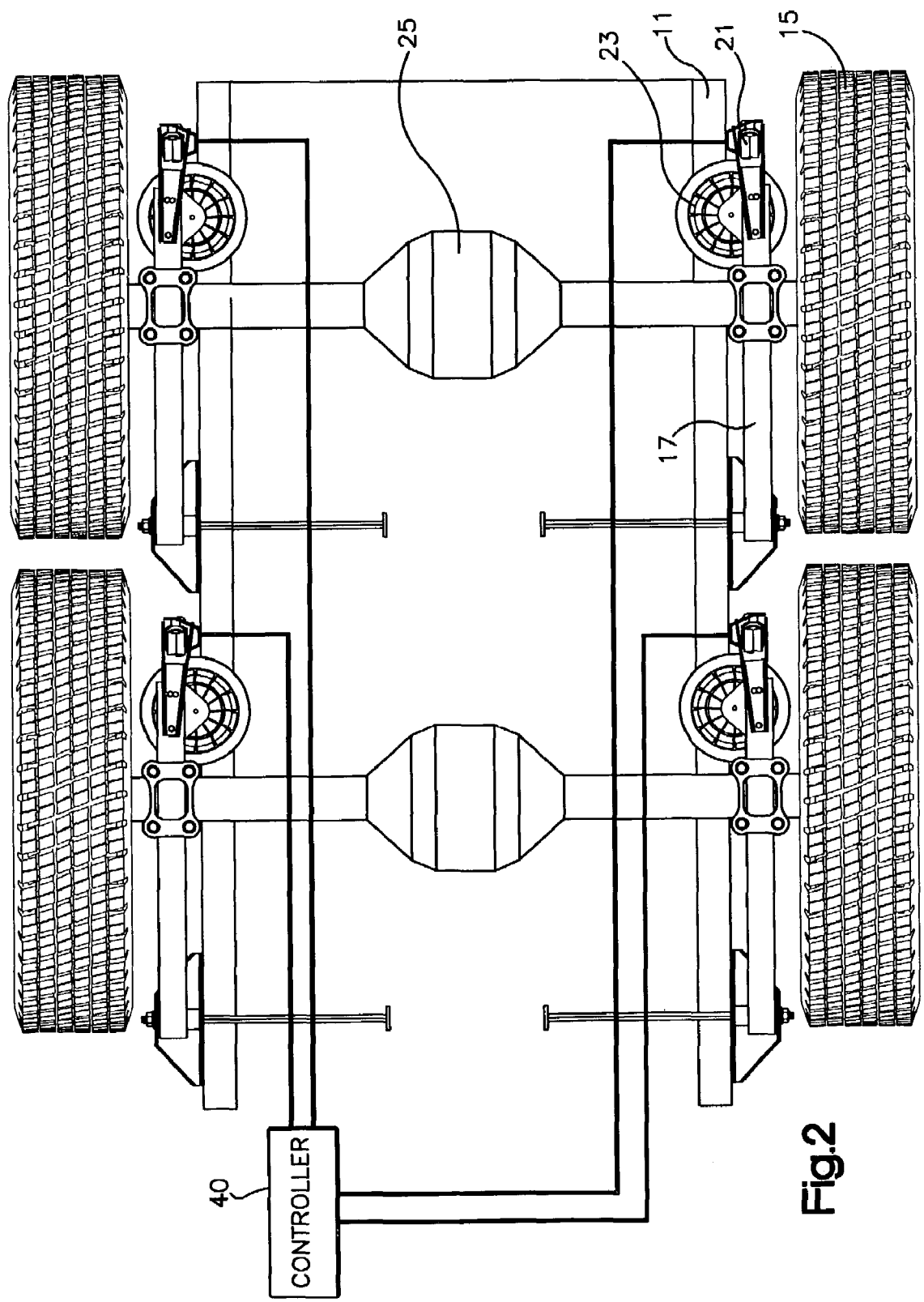
FIG. 2 is a top plan view of the suspension system of FIG. 1.

FIG. 2 shows a top view of the rear wheel sets including the drive axles 25, main support members 17, air springs 23, and locking shock absorbers 21. The controller 40 controls each of the locking shock absorbers, either individually or as a group. The controller 40 includes a microprocessor (not shown) having a memory in which instructions are stored for determining an amount of torque at each wheel and providing control signals to either a single solenoid (not shown) or individual solenoids internal to each shock absorber to lock or unlock the locking shock absorbers 21 based on the determined torque.

Figure 3:
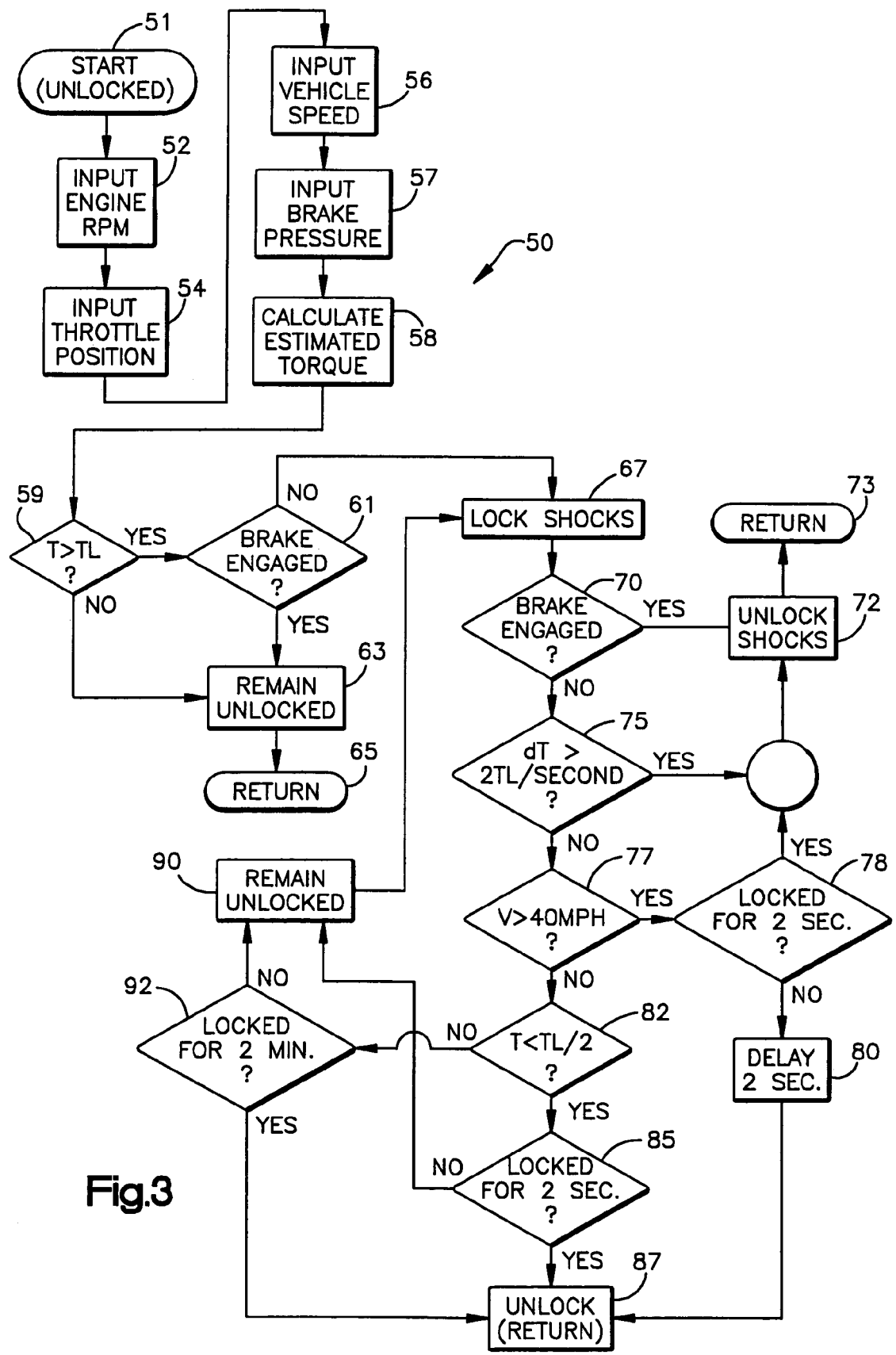
FIG. 3 is a flow chart outlining method steps that are used to maintain heavy duty truck frame position according to an embodiment of the present invention.

Referring now to FIG. 3, a locking shock control method 50 is outlined in flow chart form. The control method defaults to an unlocked mode indicated as 51. The controller 40 receives signals indicative of engine rpm, throttle position, brake pressure, and vehicle speed in steps 52, 54, 56, 57 respectively. These signals are generated by known sensors distributed throughout the vehicle such as engine sensors, throttle position, clutch engagement, and wheel sensors. Other possible inputs to the controller include air spring pressure that could give an indication of vehicle loading or weight. The controller may disable the locking mechanism when it senses a lightly loaded vehicle that does not require the locking shocks to reduce wear and tear on the system. Ride height at the rear suspension may be sensed to prevent locking the shocks at an undesirable height. Steering wheel angle and individual front wheel speeds may be input as predictors of future acceleration to allow the system to lock the shock absorbers to increase the maximum roll stiffness during cornering.

In step 58, the controller calculates a predicted steady state torque T that will be experienced by each drive axle. Torque at the drive axles is calculated based on the input signals according to the following equation:

Torque (ft.-lb.)=1450*(throttle position in degrees)

While the engine torque can be monitored directly, it has been found that calculating a predicted torque provides more time for the system to react. Because an engine will produce an approximate amount of power for a given throttle position it is possible to use actual engine data to generate an equation and constant that predicts engine output based on throttle position. The above constant 1450 was selected based on a specific engine. A different constant may be required for different engines. When used in the system, the total thrust can be calculated by dividing the total torque at the drive axles by the vehicle speed.

The predicted torque is compared to a predetermined locking torque TL, the torque at which the shock absorbers should be locked because excessive frame rise is predicted in step 59. It has been observed that the value of TL should be set at around 1000 ft-lbs for a typical heavy duty truck suspension. The value of TL will change for different suspension systems. If the predicted torque T is less than the locking torque TL, the controller determines that the shock absorbers should remain unlocked in step 63 and returns to the unlocked default state in 63. If the predicted torque T is greater than the locking torque TL, the control method determines if the brake is engaged in step 61 using data from the brake pressure sensor obtained in step 57. If the brakes are engaged, the method maintains the locking shock absorbers in the unlocked mode and returns in steps 63 and 65. If the brake is not engaged and the predicted torque T is greater than the locking torque TL, the controller sends a signal to the shock absorber control solenoids to place the shock absorbers into a locked condition in step 67.

While the shock absorbers are in the locked mode, they will remain in the locked mode for at least two seconds. However, while the shock absorbers are locked, the control method monitors for certain circumstances under which the shocks should be unlocked immediately. For example in step 70, if at any time the brakes become engaged, the method will unlock the shocks per steps 72 and 73. The shocks are unlocked during braking so that the driver does not experience different performance characteristics during braking. In step 75 the method determines if the change in the predicted torque, dT, is falling at a rate of more than twice the torque limit per second (2000 lb-ft/sec has been used for some embodiments) and if it is, the method unlocks the shock absorbers. If the vehicle is traveling at a speed higher than 40 miles per hour, and the shock absorbers have been locked for more than 2 seconds, the method unlocks the shock absorbers immediately in steps 77–78, and 72–73. If the vehicle is traveling at a speed less than 40 miles per hour, in step 82 the method determines if the predicted torque is less than half of the locking torque (500 ft-lbs for the purposes of this description) and if it is the shocks are unlocked immediately in step 87.

If the vehicle is traveling at a speed higher than 40 miles per hour and the shock absorbers have been locked from less than 2 seconds, the control method delays 2 seconds before unlocking the shock absorbers in steps 80 and 87. If the vehicle is traveling at less than 40 miles per hour and the predicted torque does not fall below half the locking torque, the method maintains the shock absorbers in the locked position for a maximum of 2 minutes, after which time the shock absorbers are unlocked.

In this manner, the control method locks the relative position of the frame before it has a chance to exceed acceptable limits based on a predicted steady state torque. Therefore drive train components are protected from damage before the frame rises excessively and operator comfort is maintained. If the operator applies the brakes or stops accelerating suddenly, the shock absorbers are unlocked to provide predictable vehicle handling. If the vehicle reaches a desired operating speed or the calculated thrust falls to an amount that will not produce excessive frame rise, the shock absorbers are unlocked after two seconds to resume normal operating characteristics. For lower vehicle speeds, the shock absorbers are allowed to remain in the locked mode for longer periods of time, such as two minutes to protect the drive train during protracted acceleration.

As can be seen from the foregoing description, a heavy duty truck suspension system having shock absorbers that are selectively locked to fix the position of the frame relative to the drive axle based on a predicted value of torque at the drive axles or thrust at the wheel can prevent frame rise before it has a chance to start. Although the present invention has been described with a degree of particularity, it is the intent that the invention include all modifications and alterations from the disclosed design falling within the spirit or scope of the appended claims.

We claim:

1. A method for controlling frame rise on a heavy duty truck having a frame, a drive axle connected to the frame, and a selectively lockable suspension component disposed between the frame and drive axle for maintaining a relative position between the frame and drive axle, the method comprising:
monitoring signals indicative of vehicle operating parameters;
calculating a predicted torque that will be applied to the drive axle based on the monitored signals;
locking the selectively lockable suspension component if the predicted torque exceeds a predetermined threshold.

2. The method of claim 1, wherein the monitored signals comprise signals indicative of at least one of the following vehicle operating parameters: engine speed, engine torque, brake pressure, vehicle speed, air bag pressure, steering wheel angle, vehicle height, or throttle position.

3. The method of claim 1 comprising determining whether the vehicle brakes are engaged and unlocking the selectively lockable suspension component when the brakes are engaged.

4. The method of claim 1 comprising calculating an instantaneous change in predicted torque and unlocking the selectively lockable suspension component if the instantaneous change in predicted torque exceeds a predetermined threshold.

5. The method of claim 1 comprising monitoring vehicle speed and the length of time the selectively lockable suspension component has been locked and unlocking the selectively lockable suspension component if the vehicle speed is higher than a predetermined nominal operating speed and the selectively lockable suspension component has been locked for more than a first time limit.

6. The method of claim 5, wherein the predetermined nominal operating speed is 40 miles per hour.

7. The method of claim 5 wherein the first time limit is 2 seconds.

8. The method of claim 1 comprising monitoring vehicle speed and the length of time the selectively lockable suspension component has been locked and unlocking the selectively lockable suspension component if the vehicle speed is lower than a predetermined nominal operating speed, the predicted torque is lower than a lower torque threshold and the selectively lockable suspension component has been locked for more than a second time limit.

9. The method of claim 8, wherein the predetermined nominal operating speed is 40 miles per hour.

10. The method of claim 8 wherein the second time limit is 2 seconds.

11. The method of claim 8 where the lower torque threshold is 500 foot-pounds.

12. The method of claim 1 comprising monitoring vehicle speed and the length of time the selectively lockable suspension component has been locked and unlocking the selectively lockable suspension component if the vehicle speed is lower than a predetermined operating speed, the predicted torque is greater than a lower torque threshold and the selectively lockable suspension component has been locked for more than a third time limit.

13. The method of claim 12 wherein the predetermined nominal operating speed is 40 miles per hour.

14. The method of claim 12 wherein the lower torque limit is 500 foot-pounds.

15. The method of claim 12 wherein the third time limit is two minutes.

16. A device for controlling frame rise on a heavy-duty truck having a frame, a drive axle connected to the frame that drives truck wheels, and a selectively lockable suspension component disposed therebetween for maintaining the relative position therebetween, the device comprising a controller having a microprocessor storing a set of instructions, the instructions comprising:
monitoring signals indicative of vehicle operating parameters;
calculating a predicted thrust that will be applied at the truck wheels based on the monitored signals; and
locking the selectively lockable suspension component if the predicted thrust exceeds a predetermined threshold.

17. The device of claim 16 wherein the monitored signals comprise signals indicative of at least one of the following vehicle operating parameters: engine speed, engine torque, brake pressure, vehicle speed, air bag pressure, steering wheel angle, vehicle height, or throttle position.

18. The device computer of claim 16 wherein the instructions comprise determining whether the vehicle brakes are engaged and unlocking the selectively lockable suspension component when the brakes are engaged.

19. The device of claim 16 wherein the instructions comprise calculating an instantaneous change in predicted thrust and unlocking the selectively lockable suspension component if the instantaneous change in predicted thrust exceeds a predetermined threshold.

20. The device of claim 16 wherein the instructions comprise monitoring vehicle speed and the length of time the selectively lockable suspension component has been locked and unlocking the selectively lockable suspension component if the vehicle speed is higher than a predetermined nominal operating speed and the selectively lockable suspension component has been locked for more that a first time limit.

21. The device of claim 16 wherein the instructions comprise monitoring vehicle speed and the length of time the selectively lockable suspension component has been locked and unlocking the selectively lockable suspension component if the vehicle speed is lower than a predetermined nominal operating speed, the predicted thrust is lower than a lower thrust threshold and the selectively lockable suspension component has been locked for more than a second time limit.

22. The device of claim 16 wherein the instructions comprise monitoring vehicle speed and the length of time the selectively lockable suspension component has been locked and unlocking the selectively lockable suspension component if the vehicle speed is lower than a predetermined operating speed, the predicted torque is greater than a lower torque threshold and the selectively lockable suspension component has been locked for more than a third time limit.

* * * * *